(12) United States Patent
Isomura

(10) Patent No.: US 9,632,794 B2
(45) Date of Patent: Apr. 25, 2017

(54) SUBPROCESSOR, INTEGRATED CIRCUIT DEVICE, AND ELECTRONIC APPARATUS

(75) Inventor: Masakazu Isomura, Tokyo-to (JP)

(73) Assignee: SEIKO EPSON CORPORATION, Tokyo (JP)

( * ) Notice: Subject to any disclaimer, the term of this patent is extended or adjusted under 35 U.S.C. 154(b) by 1134 days.

(21) Appl. No.: 13/258,717

(22) PCT Filed: Jun. 10, 2010

(86) PCT No.: PCT/JP2010/003880
§ 371 (c)(1),
(2), (4) Date: Sep. 22, 2011

(87) PCT Pub. No.: WO2010/150474
PCT Pub. Date: Dec. 29, 2010

(65) Prior Publication Data
US 2012/0023312 A1    Jan. 26, 2012

(30) Foreign Application Priority Data

Jun. 23, 2009 (JP) ................................ 2009-148665

(51) Int. Cl.
G06F 9/38        (2006.01)
(52) U.S. Cl.
CPC .................... G06F 9/3877 (2013.01)
(58) Field of Classification Search
CPC .................................................... G06F 9/3877
See application file for complete search history.

(56) References Cited

U.S. PATENT DOCUMENTS

| 4,979,102 | A | * | 12/1990 | Tokuume | .................... 709/213 |
| 5,029,073 | A | | 7/1991 | Takaya et al. | |
| 5,632,037 | A | * | 5/1997 | Maher | .......................... 713/322 |
| 6,023,757 | A | | 2/2000 | Nishimoto et al. | |

(Continued)

FOREIGN PATENT DOCUMENTS

| CN | 101023431 A | 8/2007 |
| CN | 101105711 A | 1/2008 |

(Continued)

OTHER PUBLICATIONS

International Search Report issued in Application No. PCT/JP2010/003880; Dated Jul. 13, 2010 (With Translation).

*Primary Examiner* — John Lindlof
(74) *Attorney, Agent, or Firm* — Oliff PLC

(57) ABSTRACT

A subprocessor, an integrated circuit device, and an electronic apparatus or the like capable of performing data processing efficiently are provided. A subprocessor is connected to a host processor through a bus controller. The subprocessor includes: a command fetch unit that fetches a command from a subprocessor program; a register unit; a command decoding unit that decodes the command; and an operation unit that performs command execution processing. The host processor sets a program counter value indicating a storage destination of the subprocessor program and a processing start command for, the processing of the subprocessor to the register unit. The command fetch unit fetches a command designated by the program counter value, the command decoding unit decodes the command, and the operation unit performs command execution processing.

16 Claims, 10 Drawing Sheets

(56) References Cited

U.S. PATENT DOCUMENTS

| | | | |
|---|---|---|---|
| 6,327,647 B1 | 12/2001 | Moyer et al. | |
| 6,327,650 B1* | 12/2001 | Bapst | 712/228 |
| 6,480,952 B2 | 11/2002 | Gorishek, IV et al. | |
| 6,505,290 B1 | 1/2003 | Moyer et al. | |
| 6,928,523 B2* | 8/2005 | Yamada | G06F 9/3881 |
| | | | 709/213 |
| 2002/0059510 A1 | 5/2002 | Yoshimura | |
| 2004/0030958 A1 | 2/2004 | Moerman | |
| 2005/0038962 A1* | 2/2005 | Lim | 711/118 |
| 2006/0059285 A1 | 3/2006 | Fischer et al. | |
| 2008/0016374 A1 | 1/2008 | Gee et al. | |
| 2008/0244227 A1 | 10/2008 | Gee et al. | |

FOREIGN PATENT DOCUMENTS

| | | |
|---|---|---|
| JP | A-61-150061 | 7/1986 |
| JP | A-63-247861 | 10/1988 |
| JP | A-03-250234 | 11/1991 |
| JP | A-07-271413 | 10/1995 |
| JP | A-2002-149402 | 5/2002 |
| JP | A-2006-163684 | 6/2006 |
| WO | WO 99/61981 A1 | 12/1999 |

* cited by examiner

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| | | | STATUS CODE | | | | | | | | IRQ | | RUN MODE | STOP | RUN |
| 31 | 30 | 29 | 28 | 27 | 26 | 25 | 24 | 23 | 22 | 21 | 20 | 19 | 18 | 17 | 16 |
| | | | | | | | | | | | | | | | RESET |

CONTROL REGISTER

FIG. 8A

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| | | | | | | CLIPPING CONTROL | | ROUNDING CONTROL | | | | ARITHMETIC RIGHT SHIFT CONTROL | | | |
| 31 | 30 | 29 | 28 | 27 | 26 | 25 | 24 | 23 | 22 | 21 | 20 | 19 | 18 | 17 | 16 |
| | | | | | | | | | | | | | CONDITIONAL MEMORY WRITING CONTROL | | |

OPERATION PARAMETER REGISTER

FIG. 8B

SUBPROCESSOR, INTEGRATED CIRCUIT DEVICE, AND ELECTRONIC APPARATUS

The present application claims a priority based on Japanese Patent Application No. 2009-148665 filed on Jun. 23, 2009, the contents of which are incorporated herein by reference.

TECHNICAL FIELD

The invention relates to a subprocessor, an integrated circuit device, and an electronic apparatus or the like.

BACKGROUND ART

In recent years, in the field of digital signal processing, a demand for fast and low power-consuming data processing devices has increased. In particular, in mobile devices (pulse meters, digital cameras, and the like) with a sensor mounted, it is necessary to process the signals output by the sensor in real time and with low power consumption. To solve this problem, a special-purpose processor (subprocessor) for effectively executing operation processing frequently used in digital signal processing such as product-sum operation has been developed.

For example, PTL 1 discloses a data processing device which includes a special-purpose data processing unit that performs operation processing and a general-purpose data processing unit that performs general-purpose processing. However, since a command fetch unit and a data interface are shared by these two units, there is a problem in that this method has a lot of restrictions on collaborative operations.

CITATION LIST

Patent Literature

[PTL 1] JP-A-2002-149402

SUMMARY OF INVENTION

Technical Problem

According to some aspects of the invention, it is possible to provide a subprocessor, an integrated circuit device, and an electronic apparatus or the like capable of performing data processing efficiently.

Solution to Problem

According to an aspect of the invention, there is provided a subprocessor connected to a host processor through a bus controller, including: a command fetch unit that fetches a command from a subprocessor program; a register unit; a command decoding unit that decodes the fetched command; and an operation unit that performs command execution processing based on the decoding result, in which the host processor sets a program counter value indicating a storage destination of the subprocessor program and a processing start command for the processing of the subprocessor to the register unit through the bus controller, the command fetch unit fetches a command designated by the program counter value, the command decoding unit decodes the command, and the operation unit performs the command execution processing.

According to the above aspect of the invention, since the subprocessor includes the command fetch unit that fetches a command through the bus controller, the subprocessor can independently load a program without the intervention of the host processor and perform command execution processing.

Moreover, in the above aspect of the invention, the subprocessor may include a bus controller interface that performs interface processing between the bus controller and the subprocessor.

By doing so, the subprocessor can independently fetch a command from the subprocessor program or independently perform reading or writing of data for execution of a command through the bus controller interface.

Moreover, in the above aspect of the invention, the bus controller interface may include a host interface that performs interface processing between the host processor and the subprocessor.

By doing so, the host processor can access the register unit of the subprocessor through the host interface.

Moreover, in the above aspect of the invention, the bus controller interface may include a data interface for reading or writing data for execution of a command.

By doing so, the subprocessor can independently read and write data without the intervention of the host processor.

Moreover, in the above aspect of the invention, the register unit may include a data register, and the operation unit may perform command execution processing based on data which is written to the data register through the bus controller interface and the command on the basis of the decoding RESULT.

By doing so, the host processor can write necessary data to the data register before the subprocessor starts executing processing.

Moreover, in the above aspect of the invention, the register unit may include an address register that stores address information of data which is read or written through the bus controller interface, and the address information of the address register may be written by the host processor through the bus controller interface.

By doing so, it is possible to read or write necessary data based on the address information stored in the address register. Moreover, the host processor can write the address information before the subprocessor starts executing processing.

Moreover, in the above aspect of the invention, when a processing end command of the subprocessor program is decoded, a processing complete signal may be output.

By doing so, it is possible to notify the host processor of the ending of the execution processing of the subprocessor. Moreover, when the supply of clocks to the host processor is halted during the execution processing of the subprocessor, it is possible to resume the supply of clocks by the processing complete signal.

Moreover, in the above aspect of the invention, the register unit may include a control register that includes a Run bit indicating that the subprocessor is under processing, and the Run bit may be cleared when the processing complete signal is output.

By doing so, it is possible to provide notification that the subprocessor is executing processing when "1" is set to the Run bit of the control register and that the subprocessor has ended the execution processing when "0" is set to the Run bit.

Moreover, in the above aspect of the invention, the register unit may include an operation parameter register, and when an operation parameter is written to the operation parameter register by the host processor, the operation unit may perform operation processing in accordance with the content set by the operation parameter.

By doing so, it is possible to set the initial value for option control of operation processing such as arithmetic right shift control by allowing the host processor to write the operation parameter before the subprocessor starts executing processing.

Moreover, in the above aspect of the invention, the register unit may include an operation parameter register, and when an operation parameter is written to the operation parameter register in accordance with an operation parameter setting command of the subprocessor program, the operation unit may perform operation processing in accordance with the content set by the operation parameter.

By doing so, it is possible to flexibly execute option control of operation processing such as arithmetic right shift control by writing the operation parameter in accordance with a command described in the subprocessor program.

According to another aspect of the invention, there is provided an integrated circuit device including: the subprocessor described above; and the bus controller connected to the subprocessor and the host processor, the bus controller performs bus control between a memory in which the host processor program and the subprocessor program are stored, the host processor, and the subprocessor.

According to the above aspect of the invention, since the subprocessor can execute targeting data processing independently, the host processor can concurrently perform processing that is not directly dependent on the processing during the execution processing of the subprocessor. As a result, the data processing can be executed at a high speed.

Moreover, in the above aspect of the invention, the integrated circuit device may further include the host processor.

Moreover, in the above aspect of the invention, the integrated circuit device may further include a clock generation circuit, and the clock generation circuit may stop supplying clocks to the host processor after a processing start command is executed and resume the supply of clocks to the host processor after the processing of the subprocessor is complete.

By doing so, since the host processor does not need to operate during the execution processing of the subprocessor, it is possible to halt the operation of the host processor to thereby decrease the power consumption of the data processing device (integrated circuit device).

According to another aspect of the invention, there is provided an electronic apparatus having the integrated circuit device described above.

BRIEF DESCRIPTION OF DRAWINGS

FIGS. 8A and 8B show an example of a bit configuration of a resister.

DESCRIPTION OF EMBODIMENTS

Hereinafter, embodiments of the invention will be described with reference to the drawings. It should be noted that the embodiments described below do not disadvantageously restrict the content of the invention described in the scope of the claims and not all of the constructions described with reference to the following embodiments are necessary as the solving means of the invention.

1. Basic Configuration Example of Data Processing Device

Figure 1:
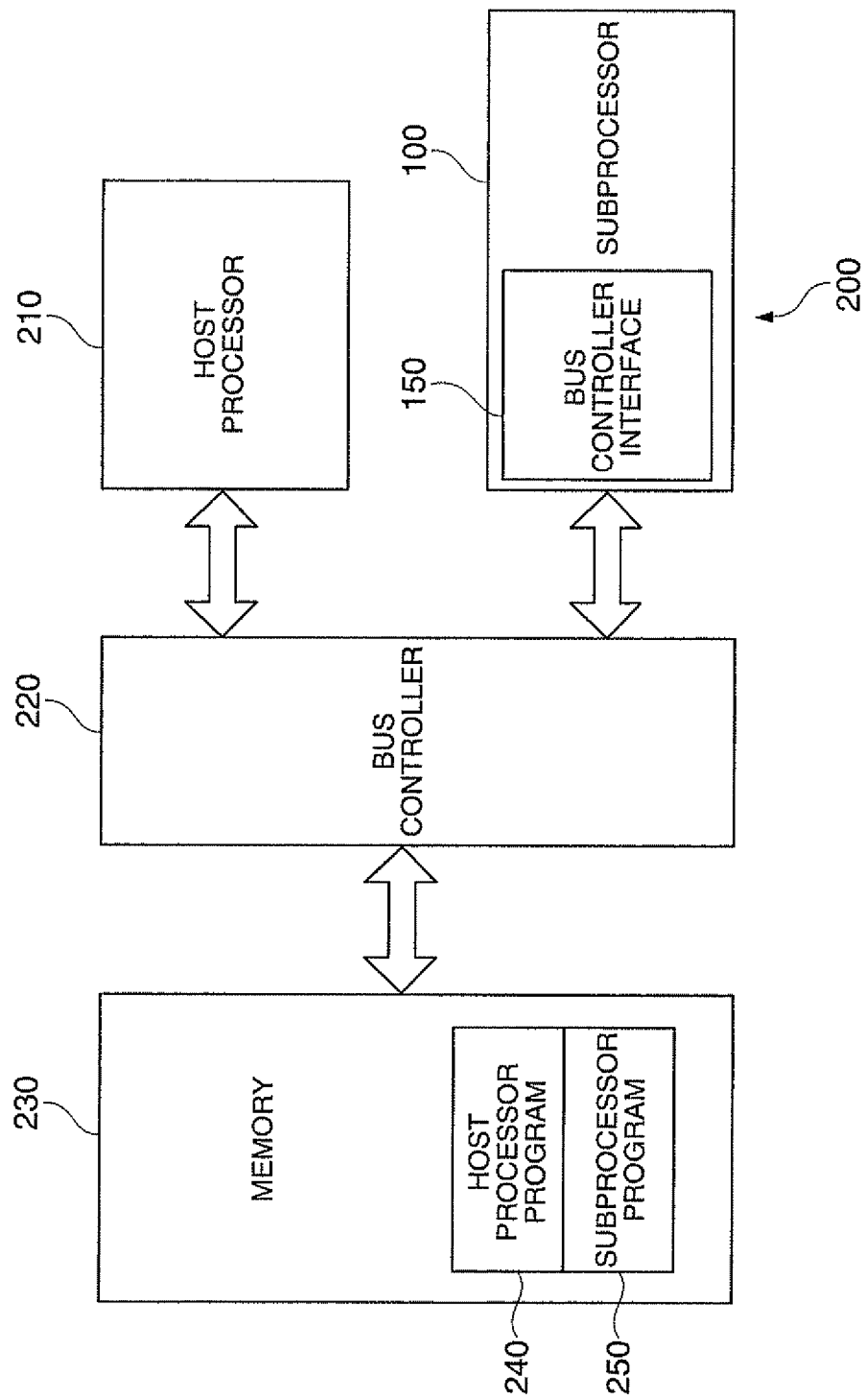
FIG. 1 shows a basic configuration example of a data processing device.

FIG. 1 shows a basic configuration example of a data processing device (integrated circuit device) of the present embodiment. A data processing device (integrated circuit device) 200 shown in FIG. 1 is a system in which a host processor 210 and a subprocessor 100 perform data processing in collaboration with each other, and includes the subprocessor 100, the host processor 210, a bus controller 220, and a memory 230. The data processing device 200 is not limited to the configuration of FIG. 1, but may be modified in various ways such that a part of the constituent elements may be omitted, other constituent elements may be substituted, or other constituent elements may be added. For example, the host processor 210 may not be included in the data processing device 200 (integrated circuit device), but the host processor 210 may be an external integrated circuit device.

The subprocessor (coprocessor) 100 fetches a command from a subprocessor program 250 stored in the memory 230, decodes the fetched command, and performs targeting data processing. A command for the targeting data processing is described in the subprocessor program 250. The bus controller 220 is connected to the subprocessor 100 and the host processor 210 so as to perform bus control between the memory 230, the host processor 210, and the subprocessor 100.

According to the data processing device shown in FIG. 1, when the subprocessor 100 receives a processing start command from the host processor 210, the subprocessor 100 can execute data processing independently without the intervention of the host processor 210. That is, the subprocessor 100 fetches a command from the subprocessor program 250 through the bus controller 220, decodes the fetched command, and performs targeting data processing. The subprocessor 100 can read data necessary for processing from the memory 230 through the bus controller 220 and write operation results to the memory 230. The ability to execute processing independently is attributable to the fact that the subprocessor 100 includes a bus controller interface 150 as will be described later.

As described above, according to the data processing device (integrated circuit device) 200 of the present embodiment, the subprocessor 100 can execute the targeting data processing independently. Thus, during the execution processing of the subprocessor 100, the host processor 210 can concurrently perform processing that is not directly dependent on the processing. As a result, the data processing can be executed at a high speed. Moreover, when the processing of the host processor 210 becomes unnecessary during the execution of the subprocessor 100, since the operation of the host processor 210 can be halted, it is possible to decrease the power consumption of the data processing device (integrated circuit device) 200.

Although in FIG. 1, the memory 230 is included in the data processing device (integrated circuit device) 200, it is not essential to provide the memory 230 at an inner side of the data processing device (integrated circuit device) 200. The memory 230 may be at the outer side of the data processing device (integrated circuit device) 200.

2. Configuration Example of Subprocessor

Figure 2:
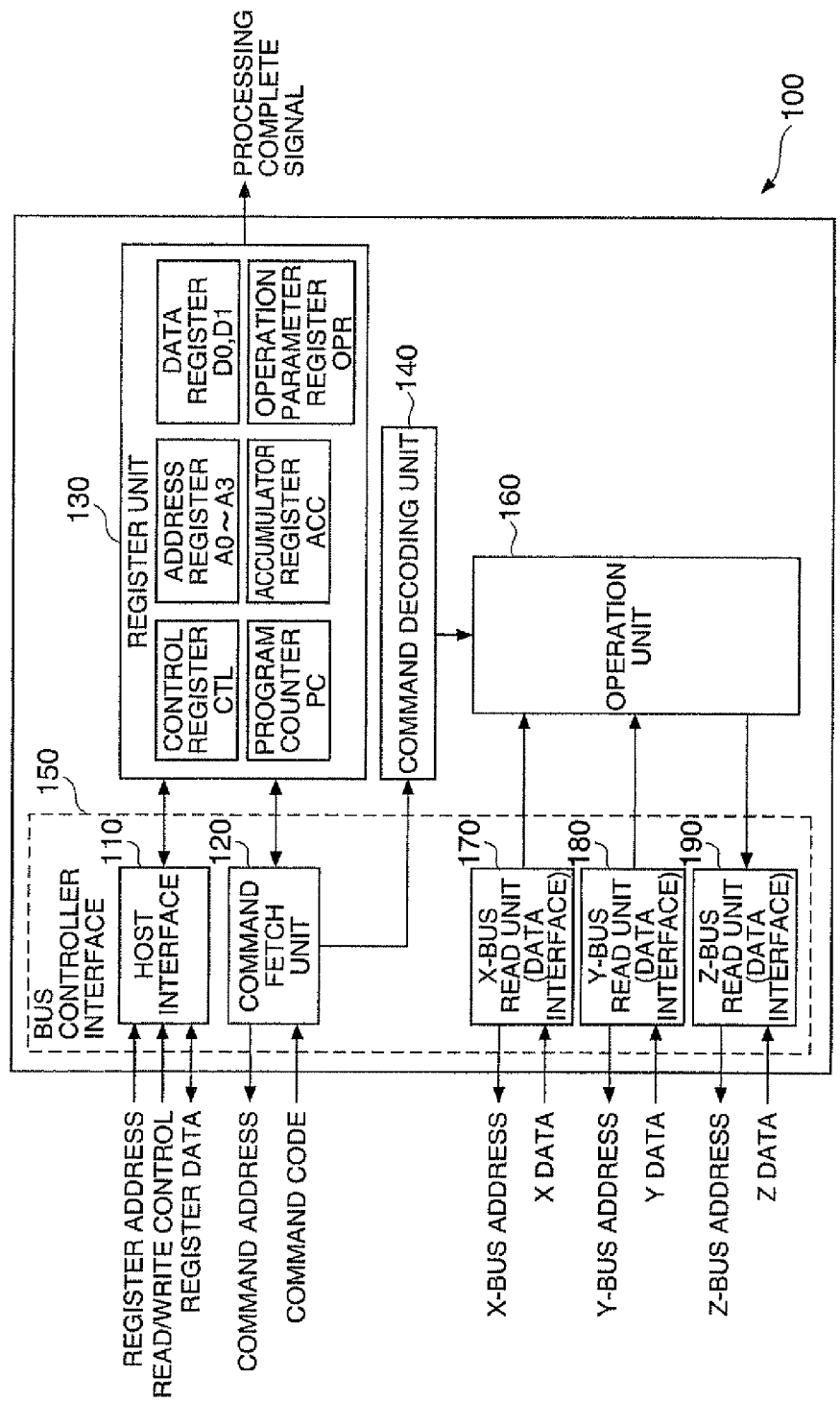
FIG. 2 shows a configuration example of a subprocessor.

FIG. 2 shows a configuration example of the subprocessor 100 of the present embodiment. The subprocessor 100 shown in FIG. 2 includes the bus controller interface 150, a register unit 130, a command decoding unit 140, and an operation unit 160. In addition, the bus controller interface 150 includes a host interface 110, a command fetch unit 120, and a data interface. The data interface includes an X-bus read unit 170, a Y-bus read unit 180, and a Z-bus write unit 190. The operation unit 160, the X-bus read unit 170, the Y-bus read unit 180, and the Z-bus write unit 190 form an operation pipeline unit.

The subprocessor 100 of the present embodiment is not limited to the configuration of FIG. 2, but may be modified in various ways such that a part of the constituent elements may be omitted, other constituent elements may be substituted, or other constituent elements may be added. For example, it is not an essential requirement that the bus controller interface 150 is composed of the host interface 110, the command fetch unit 120, the X-bus read unit 170, the Y-bus read unit 180, and the Z-bus write unit 190 as shown in FIG. 2. Instead of providing the independent host interface 110, the function of the host interface may be provided to any one of the other four constituent elements.

The bus controller interface 150 performs interface processing between the bus controller 220 and the subprocessor 100. Specifically, the bus controller interface 150 performs interface processing for connecting the subprocessor 100 and the bus controller 220. The bus controller interface 150 includes the host interface 110 that performs the interface processing between the host processor 210 and the subprocessor. Specifically, the host interface 110 performs the interface processing for allowing the host processor 210 to write or read a register value to or from the register unit 130. Moreover, the bus controller interface 150 includes the data interface for performing reading or writing of data for execution of commands. Specifically, the data interface includes the X-bus read unit 170, the Y-bus read unit 180, and the Z-bus write unit 190. The X-bus read unit 170 and the Y-bus read unit 180 perform reading of data, and the Z-bus write unit 190 performs writing of data.

The command fetch unit (program interface) 120 fetches the command from the subprocessor program 250, and the command decoding unit 140 decodes the fetched command. The operation unit 160 executes the command based on the decoding results.

The register unit 130 includes a control register CTL, a program counter PC, address register A0 to A3, data registers D0 and D1, an accumulator register ACC, and an operation parameter register OPR. The register configuration of the register unit 130 is not limited to this.

The control register CTL has bits related to the control of transmission or the like of the start, halt, and interrupt signals for execution of the subprocessor 100. The program counter PC stores an address (program counter value) in which the subprocessor program 250 is stored. The address registers A0 to A3 store the address information of data read or written through the data interface. The data necessary for processing are written to the data registers D0 and D1 through the host interface 110 (in a broader sense, the bus controller interface 150). The accumulator register ACC temporarily stores the intermediate results of the operation in the operation unit 160. The operation parameter register OPR stores operation parameters for controlling various options of operation processing.

Figure 3:
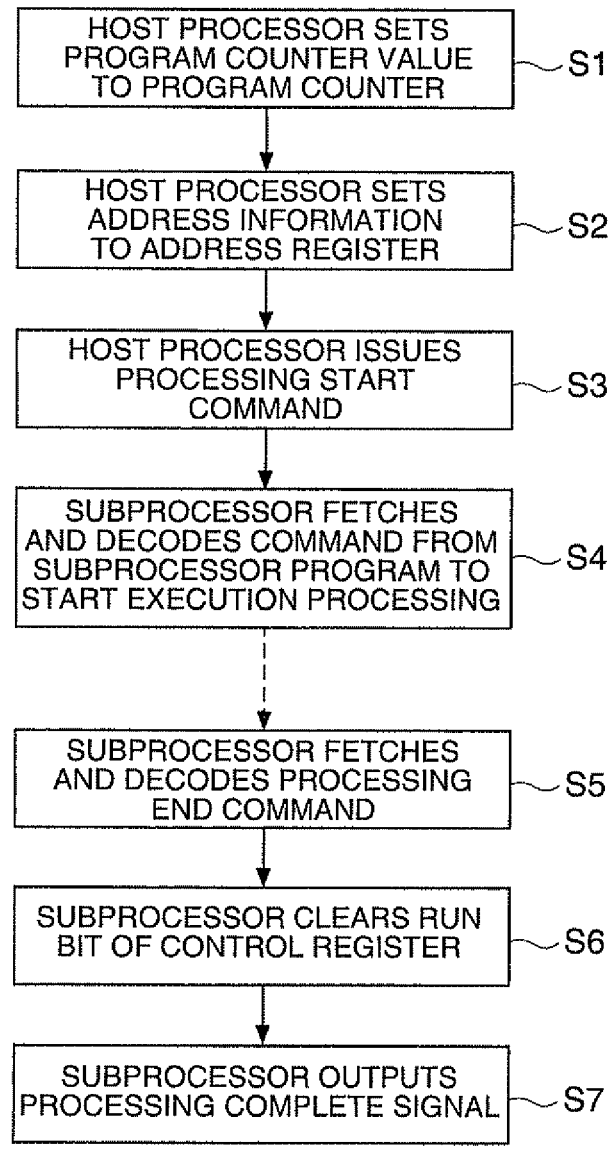
FIG. 3 shows a flowchart of a basic operation of the subprocessor.
Figure 4:
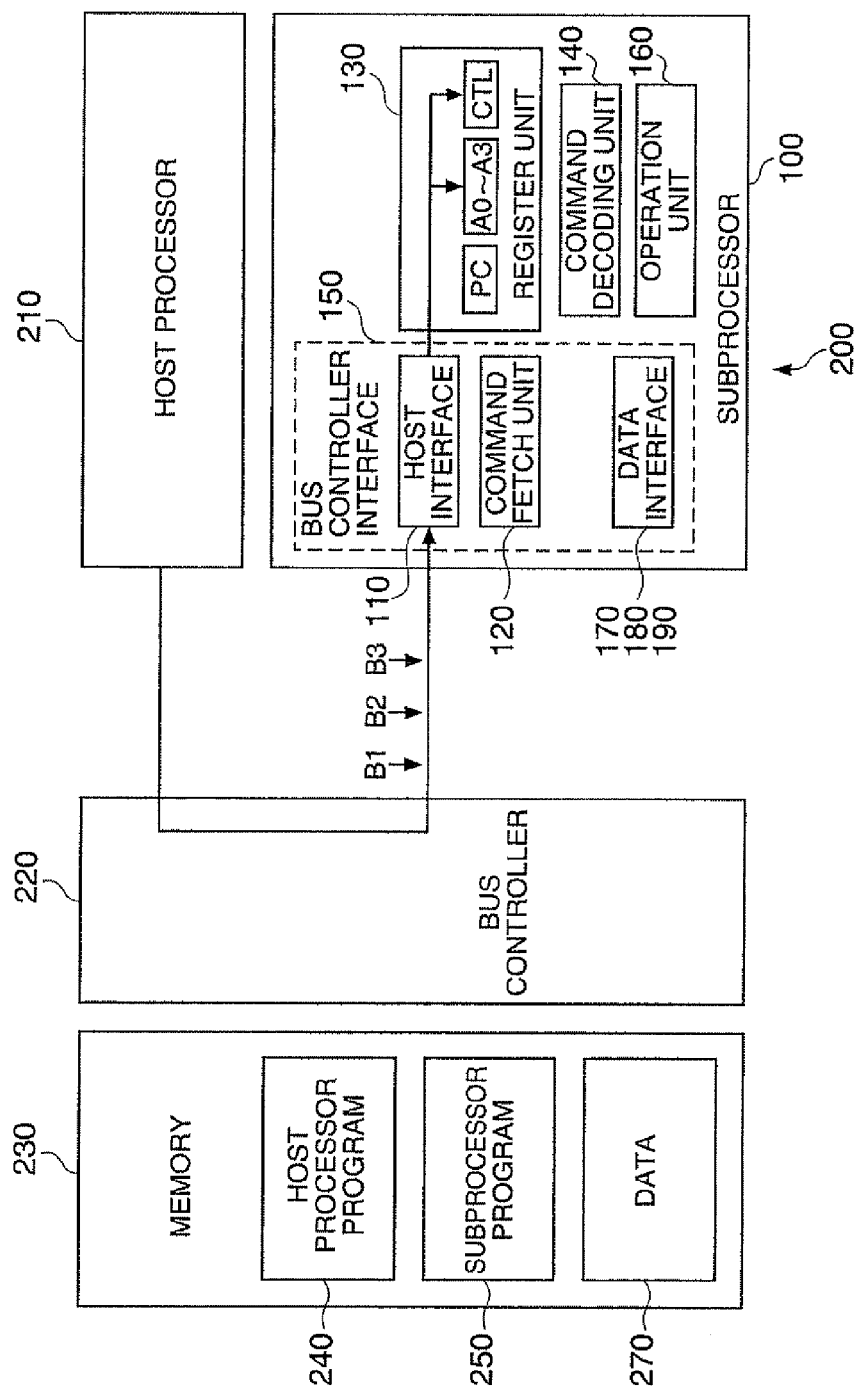
FIG. 4 is a diagram illustrating the operation of the subprocessor.
Figure 5:
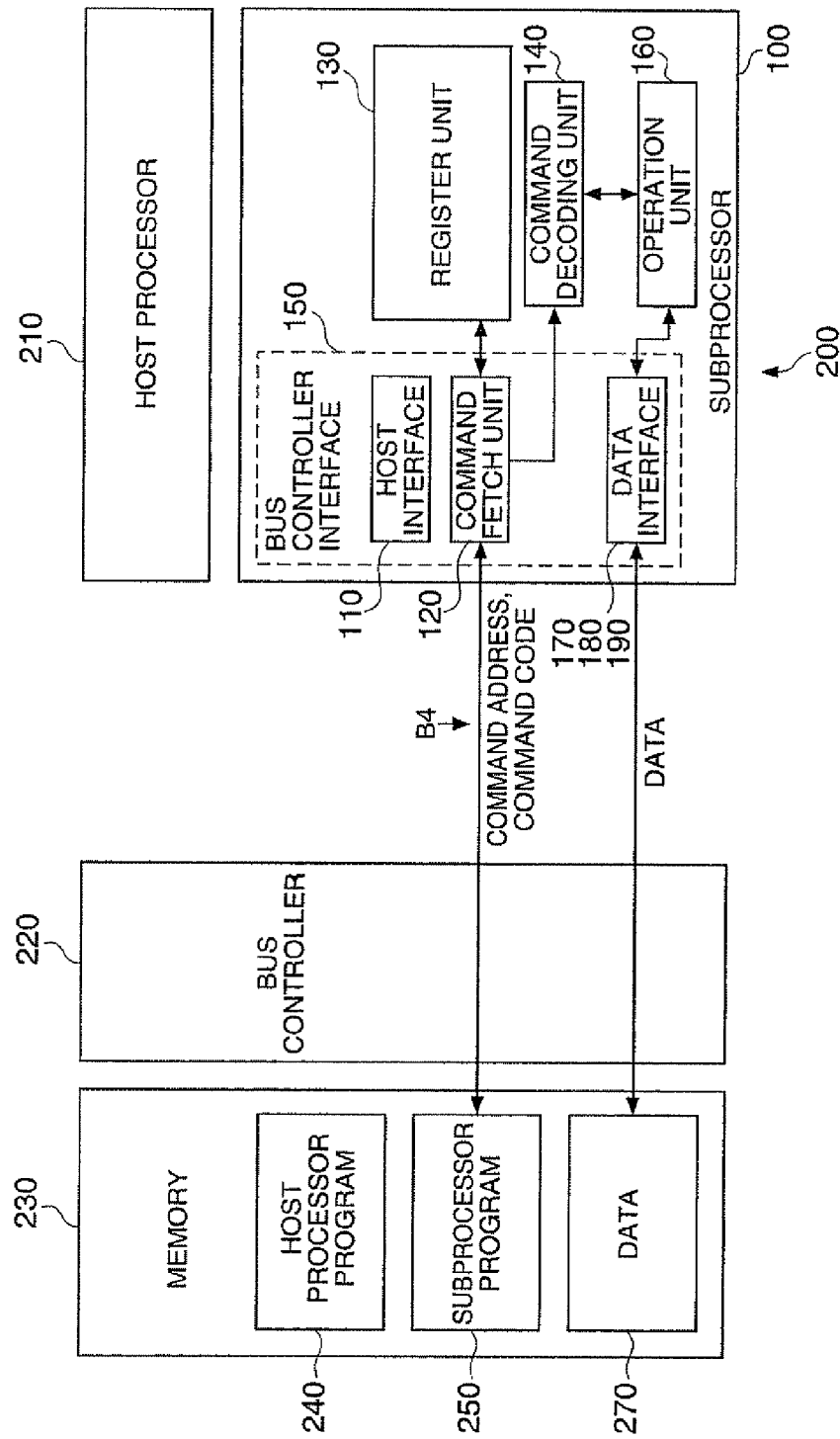
FIG. 5 is a diagram illustrating the operation of the subprocessor.
Figure 6:
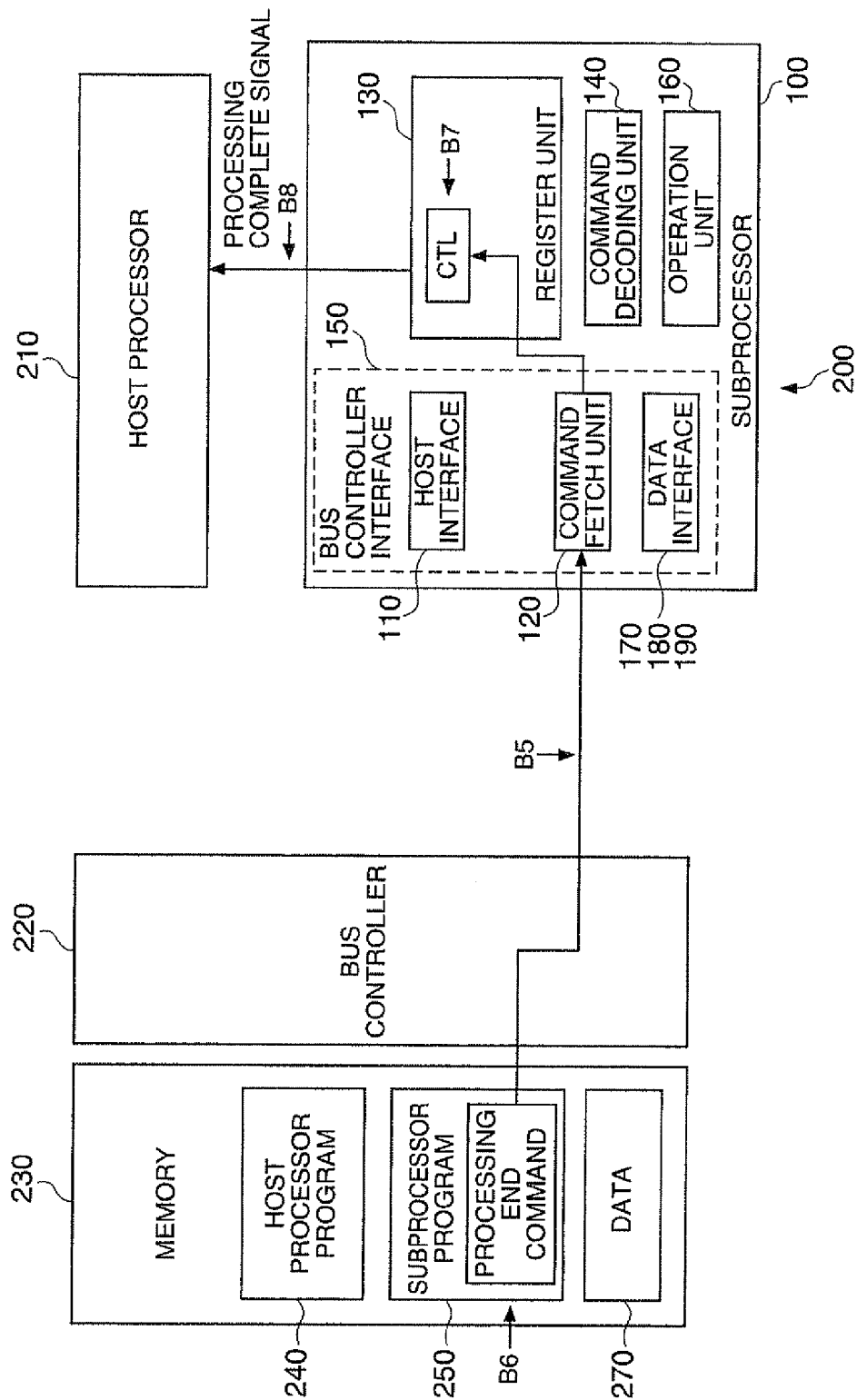
FIG. 6 is a diagram illustrating the operation of the subprocessor.

FIG. 3 is a flowchart illustrating a basic operation of the subprocessor 100. Moreover, FIGS. 4 to 6 are block diagrams illustrating the basic operation of the subprocessor 100. Hereinafter, respective steps S1 to S7 of the operation of the subprocessor 100 will be described with reference to FIGS. 3 to 6.

First, in step S1, as indicated by E1 in FIG. 4, the host processor 210 sets an address (program counter value) indicating a storage destination of the subprocessor program 250 to the program counter PC through the host interface 110 (in a broader sense, the bus controller interface 150). Specifically, the host processor 210 supplies a register address and a program counter value of the program counter PC to the host interface 110 together with a write control signal, and the host interface 110 sets the program counter value to the program counter PC.

Subsequently, in step S2, as indicated by B2 in FIG. 4, the host processor 210 sets necessary address information to the address registers A0 to A3 through the host interface 110 (in a broader sense, the bus controller interface 150). The address information is the address indicating the location of input data and the storage destination of output data, which are processed by the subprocessor 100. Furthermore, the host processor 210 sets data necessary for the data processing performed by the subprocessor 100 to the data registers D0 and D1 as necessary.

Subsequently, in step S3, as indicated by B3 in FIG. 4, the host processor 210 issues a processing start command. Specifically, the host processor 210 writes "1" to the Run bit of the control register CTL through the host interface 110 (in a broader sense, the bus controller interface 150).

Subsequently, in step S4, as indicated by B4 in FIG. 5, the subprocessor 100 fetches the command from the subprocessor program 250, decodes the fetched command, and starts executing processing. Specifically, the command fetch unit 120 outputs the program counter value to the bus controller 220 as a command address and receives and fetches a command code from the bus controller 220. At the same time, the command fetch unit 120 updates the program counter value with the next command address. In addition, the command decoding unit 140 decodes the command code to generate a necessary control signal and controls the operation unit 160.

The operation pipeline unit performs the following operation processing, for example. The X-bus read unit 170 and the Y-bus read unit 180 read data from addresses (addresses on the memory 230) indicated by the address registers A0 to A3 which are designated by the command code based on the control signal supplied from the command decoding unit 140 and supply the data to the operation unit 160. The operation unit 160 performs an operation based on the command code and outputs the operation results to the Z-bus write unit 190. The Z-bus write unit 190 writes the operation results to the addresses (the addresses on the memory 230) indicated by the address registers A0 to A3 which are designated by the command code.

A value "1" is set to the Run bit of the control register CTL during the period when the subprocessor 100 performs processing. That is, the value "1" set to the Run bit implies that the subprocessor 100 is executing processing.

Subsequently, in step S5, as indicated by E5 in FIG. 6, the subprocessor 100 fetches and decodes a processing end command. The processing end command is an EXIT command, or the like, for example, and is a command described in the subprocessor program 250 as indicated by B6 in FIG.

6 (for example, the command is described in a program processing end step of the subprocessor program 250). When this command is fetched, the subprocessor 100 ends the operation processing.

Subsequently, in step S6, as indicated by 37 in FIG. 6, the subprocessor 100 clears (namely, writes 0 to) a predetermined bit (the Run bit) of the control register CTL.

Subsequently, in step S7, as indicated by B8 in FIG. 6, the subprocessor 100 outputs a processing complete signal. Specifically, when the subprocessor 100 fetches the processing end command, a value "1" is set to an IRQ bit (interrupt request bit) of the control register CTL. When the value "1" is set to the IRQ bit, the processing complete signal is output.

In this way, due to the presence of the command fetch unit 120 (in a broader sense, the bus controller interface 150) and the data interface (in a broader sense, the bus controller interface 150), the subprocessor 100 can execute data processing independently.

As described above, in the present embodiment, the subprocessor is provided with the host interface 110 (in a broader sense, the bus controller interface 150) for performing interface processing between the host processor 210 and the subprocessor through the bus controller 220 or the like. That is, the subprocessor is provided with the host interface 110 which is generally not provided in a subprocessor of this type. Moreover, the program counter value indicating the storage destination of the subprocessor program and the processing start command of the subprocessor are written to the register unit 130 through the host interface 110. Thus, after the host processor 210 issues a processing start command, the subprocessor 100 can independently load the subprocessor program 250 from the address (the program counter value) that is indicated by the program counter PC and execute targeting data processing. Moreover, the subprocessor 100 can independently read and write data from and to the address indicated by the address register that is designated by the command code.

As described above, the subprocessor 100 of the present embodiment can execute targeting data processing independently without the intervention of the host processor 210. Thus, during the execution processing of the subprocessor 100, the host processor 210 can perform processing that is not directly dependent on the processing. As a result, the data processing can be executed at a high speed. Moreover, when the processing of the host processor 210 becomes unnecessary during the execution of the subprocessor 100, since the operation of the host processor 210 can be halted, it is possible to decrease the power consumption of the data processing device (integrated circuit device) 200. That is, in the present embodiment, by providing the bus controller interface 150 to the subprocessor 100, independent data processing by the subprocessor 100, a reduction in power consumption, and the like are made possible.

3. Configuration Example of Command Code

Figure 7:
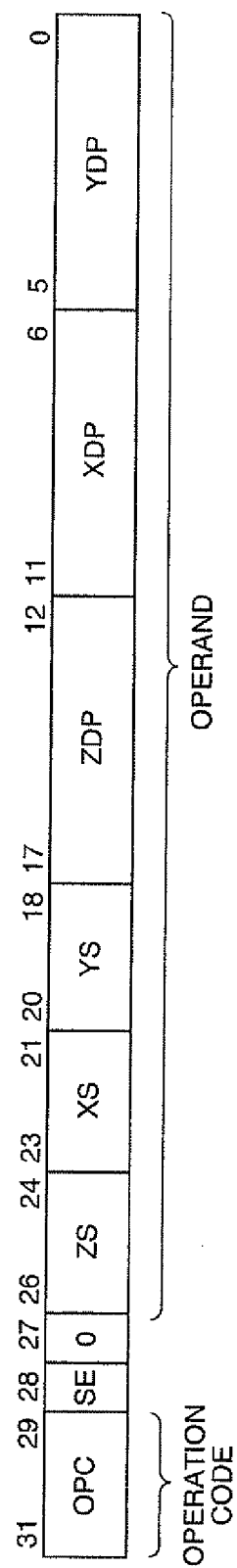
FIG. 7 shows an example of a command code.

FIG. 7 shows an example of the command code of the subprocessor 100 of the present embodiment. The command code for operations such as, for example, addition, subtraction, or multiplication has a configuration shown in FIG. 7.

An operation code OPC indicates the type of operation, and an operand indicates an input and output method of data. Furthermore, as shown in FIG. 7, the operand is made up of fields XS, YS, and ZS for designating data input and output address registers and fields XDP, YDP, and ZDP for designating displacements for updating the address registers after accessing.

Specifically, the fields XS and YS designate the address registers A0 to A3 storing the addresses on the memory when the X-bus read unit 170 and the Y-bus read unit 180 read data from the memory 230. The field ZS designates the address registers A0 to A3 storing the destination addresses on the memory to which the Z-bus write unit 190 writes the operation results. Moreover, the operand fields may designate immediate input data and designate the data registers D0 and D1 of the register unit 130 as well as inputting and outputting data to and from the memory 230.

4. Configuration Example of Register

FIGS. 8(A) and 8(B) show an example of a bit configuration of the register of the subprocessor 100 of the present embodiment. FIG. 8(A) shows the configuration of the control register CTL, and FIG. 8(B) shows the configuration of the operation parameter register OPR.

As shown in FIG. 8(A), the control register CTL includes a Run bit and an IRQ bit (interrupt request bit). As described above, the execution of the subprocessor 100 starts when the host processor 210 writes "1" to the Run bit of the control register CTL through the host interface 110. The value "1" is set to the Run bit during execution of processing. Moreover, when the subprocessor 100 fetches a processing end command, a value "1" is set to the IRQ bit (interrupt request bit). When the value "1" is set to the IRQ bit, a processing complete signal is output.

As shown in FIG. 8(B), the operation parameter register OPR stores operation parameters for controlling various options of operation processing. For example, an arithmetic right shift control parameter controls an arithmetic right shift when writing operation results to a memory. A clipping control parameter controls clipping when writing operation results to a memory. A conditional memory writing control parameter controls memory writing which requires conditional determination.

These operation parameters are written by the host processor 210 through the host interface 110 (in a broader sense, the bus controller interface 150), for example. Alternatively, the operation parameters are written by an operation parameter setting command of the subprocessor program 250. That is, the content of the operation parameter can be changed by the operation parameter setting command described in the subprocessor program 250.

As described above, since the subprocessor 100 of the present embodiment is provided with the host interface 110, it is possible, for example, to set an initial value or the like of the operation parameter through the host interface 110. Moreover, the content of the operation parameter can be changed as needed by the operation parameter setting command described in the subprocessor program 250. In this way, flexible option control by the operation parameter can be realized.

5. Modified Example of Data Processing Device

Figure 9:
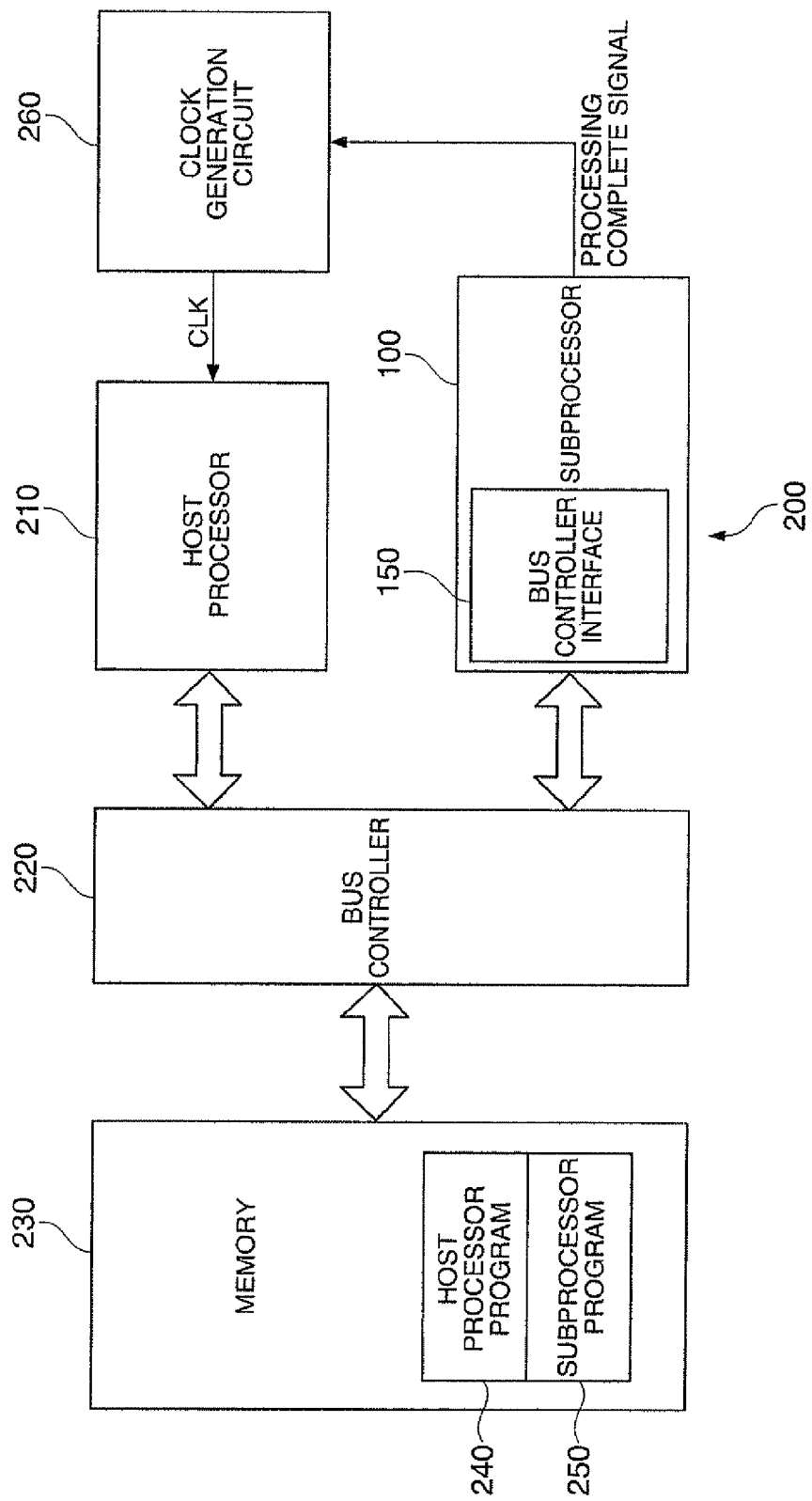
FIG. 9 shows a modified example of a data processing device.

FIG. 9 shows a modified example of the data processing device (integrated circuit device) of the present embodiment. A data processing device (integrated circuit device) 200 of FIG. 9 includes a clock generation circuit 260 in addition to the constituent elements shown in FIG. 1.

As described above, the subprocessor 100 of the present embodiment can execute targeting data processing independently without the intervention of the host processor 210. Thus, the host processor 210 can halt its operation in a period when the subprocessor 100 is executing the data processing. Moreover, the host processor 210 may resume its operation after the subprocessor 100 completes the processing.

Specifically, after the host processor 210 issues a processing start command to the subprocessor 100 through the host interface 110 (in a broader sense, the bus controller interface 150), the subprocessor 100 operates and executes data processing independently. Thus, during the data processing period of the subprocessor 100, when the operation of the host processor 210 is not necessary, the host processor 210 issues a HALT command or the like to halt the supply of clocks from the clock generation circuit 260, whereby the host processor 210 can halt its operation. By doing so, during the data processing period, since the host processor 210 is halted, and only the subprocessor 100 operates, it is possible to prevent a situation in which unnecessary power is consumed by the host processor 210.

On the other hand, after completion of the data processing, since the host processor 210 is in the halted state, the host processor 210 is unable to receive a processing complete signal from the subprocessor 100. Therefore, the subprocessor 100 outputs the processing complete signal to the clock generation circuit 260 rather than to the host processor 210, and the clock generation circuit 260 having received this signal resumes the supply of clocks to the host processor 210. By doing so, the host processor 210 in which the supply of clocks is resumed can restart its operation and execute operation processing or the like using the results of the data processing by the subprocessor 100, for example.

By so doing, since the operation of the host processor 210 can be halted during the execution processing of the subprocessor 100, it is possible to decrease the power consumption of the data processing device (integrated circuit device) 200.

6. Electronic Apparatus

Figure 10:
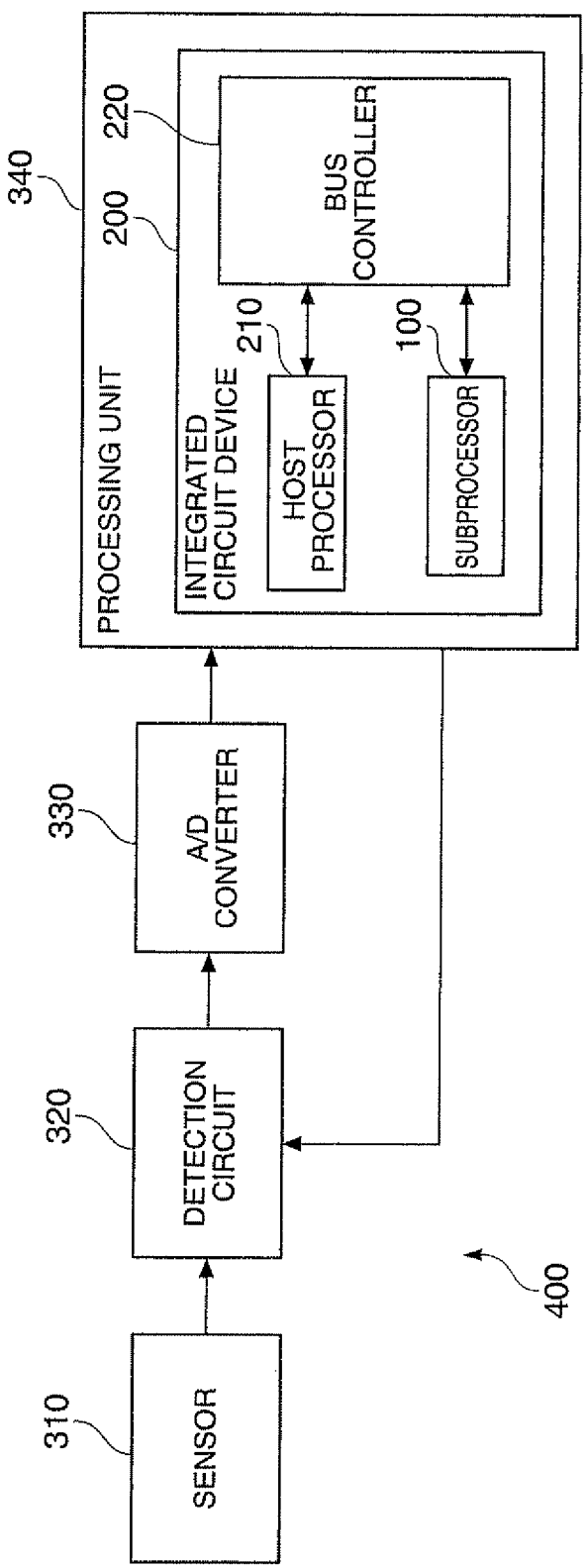
FIG. 10 shows an example of an electronic apparatus.

FIG. 10 shows an example of an electronic apparatus including the data processing device (integrated circuit device) of the present embodiment. An electronic apparatus 400 of FIG. 10 includes a sensor 310, a detection circuit 320, an A/D converter 330, and a processing unit 340. The processing unit 340 is realized by the integrated circuit device 200 which is the data processing device of the present embodiment. The detection circuit 320 and the A/D converter 330 may be integrated into the integrated circuit device 200 to form one chip.

The electronic apparatus 400 is a pulse meter, a pedometer, a digital camera, or the like, for example. The sensor 310 is a gyro sensor, an acceleration sensor, a photo sensor, a pressure sensor, or the like, and a sensor corresponding to the purpose of the electronic apparatus 400 is used. The detection circuit 320 amplifies the output signal (sensor signal) from the sensor 310 and removes noise using a filter. The A/D converter 330 converts the amplified signal into a digital signal and outputs the digital signal to the processing unit 340.

The processing unit 340 executes necessary digital signal processing on the digital signal from the A/D converter 330. Moreover, gain control of the detection circuit 320 or the like may be performed. Here, the digital signal processing performed by the processing unit 340 may include Fourier transform or the like, for example.

Since the sensor signal from the sensor 310 generally is a very small amplitude signal, in order to extract a desired signal from the sensor signal, the detection circuit 320 needs to perform an operation of detecting the desired signal under a low-noise environment. Moreover, in order to extract the desired signal from a very small amplitude sensor signal, data processing with high processing load such as, for example, fast Fourier transform is required.

In this respect, in the present embodiment, data processing with high processing load for extracting a desired signal from a very small amplitude sensor signal can be executed by the subprocessor 100 having high operation processing capability at high speed. Moreover, in this case, as shown in FIG. 9, by putting the host processor 210 into a halted state, it is possible to prevent noise from the host processor 210 from having an adverse effect on the detection circuit 320.

Moreover, it is necessary to suppress unnecessary power consumption in order for the electronic apparatus 400 such as a pulse meter or a pedometer to operate for a long period just with the power from a battery. In this respect, in the present embodiment, the host processor 210 can be put into a halted state during the operation of the subprocessor 100, or conversely, the subprocessor 100 can be put into a halted state during the operation of the host processor 210. Thus, it is possible to suppress unnecessary power consumption and to make for a long time the electronic apparatus 400 driven with batteries operate.

Although some embodiments of the invention have been described above in detail, those skilled in the art will readily understand that various modifications may be made without substantially departing from the new items and the effects of the invention. Therefore, such modifications are entirely included within the scope of the invention. For example, any term described at least once together with a broader or synonymous different term in the specification or the drawing may be replaced by the different term at any place in the specification or the drawings. Moreover, the configuration and operation of the subprocessor, the integrated circuit device, and the electronic apparatus are not limited to those described in the present embodiment, but may be modified in various ways.

REFERENCE SIGNS LIST

100: SUBPROCESSOR
110: HOST INTERFACE
120: COMMAND FETCH UNIT
130: REGISTER UNIT
140: COMMAND DECODING UNIT
150: BUS CONTROLLER INTERFACE
160: OPERATION UNIT
170: X-BUS READ UNIT
180: Y-BUS READ UNIT
190: Z-BUS WRITE UNIT
200: DATA PROCESSING DEVICE (INTEGRATED CIRCUIT DEVICE)
210: HOST PROCESSOR
220: BUS CONTROLLER
230: MEMORY
240: HOST PROCESSOR PROGRAM
250: SUBPROCESSOR PROGRAM
260: CLOCK GENERATION CIRCUIT
270: DATA
310: SENSOR
320: DETECTION CIRCUIT
330: A/D CONVERTER
340: PROCESSING UNIT
400: ELECTRONIC APPARATUS

The invention claimed is:

1. An integrated circuit device comprising:
a bus controller;
a clock generation circuit configured to supply and stop supplying clock to a host processor; and
a subprocessor connected to the host processor through the bus controller, the subprocessor including:
- a command fetch unit that fetches a command from a subprocessor program;
- a register unit;
- a command decoding unit that decodes the command from the subprocessor program; and
- an operation unit that performs command execution processing based on an output of the command decoding unit, the host processor setting a program counter value indicating a storage destination of the subprocessor program and a processing start command for a processing of the subprocessor to the register unit, the command fetch unit fetching a first command designated by the program counter value, the command decoding unit decoding the first command, the operation unit performing the command execution processing, the bus controller being connected to the subprocessor and the host processor, the bus controller performing bus control between a memory in which a host processor program and the subprocessor program are stored, the host processor, and the subprocessor, when a processing end command of the subprocessor program is decoded, the subprocessor issuing a processing complete signal, upon the host processor issuing the processing start command and the processing of the subprocessor being executed by the subprocessor, the host processor issuing a stop signal to the clock generation circuit to stop the clock generation circuit from supplying clock to the host processor, and the clock generation circuit, after stopping supplying clock, resuming the supply of clock to the host processor upon receiving the processing complete signal issued from the subprocessor.

2. The integrated circuit device according to claim 1, further comprising a bus controller interface that performs interface processing between the bus controller and the subprocessor.

3. The integrated circuit device according to claim 2, the bus controller interface including a host interface that performs interface processing between the host processor and the subprocessor.

4. The integrated circuit device according to claim 2, the bus controller interface including a data interface for reading or writing data for execution of a command.

5. The integrated circuit device according to claim 2, the register unit including a data register, and
the operation unit performing command execution processing based on data which is written to the data register through the bus controller interface and the output of the command decoding unit.

6. The integrated circuit device according to claim 2, the register unit including an address register that stores address information of data which is read or written through the bus controller interface, and
the address information of the address register being written by the host processor through the bus controller interface.

7. The integrated circuit device according to claim 1, the register unit includes a control register that includes a Run bit indicating that the subprocessor being under processing, and
the Run bit being cleared when the processing complete signal is output.

8. The integrated circuit device according to claim 1, the register unit including an operation parameter register,
when an operation parameter being written to the operation parameter register by the host processor, the operation unit performs operation processing in accordance with the content set by the operation parameter.

9. The integrated circuit device according to claim 1, the register unit including an operation parameter register, and
when an operation parameter is written to the operation parameter register in accordance with an operation parameter setting command of the subprocessor program, the operation unit performing operation processing in accordance with the content set by the operation parameter.

10. The integrated circuit device according to claim 1, further comprising the host processor.

11. An electronic apparatus comprising the integrated circuit device according to claim 1.

12. The integrated circuit device according to claim 3, the bus controller interface including a data interface for reading or writing data for execution of a command.

13. The integrated circuit device according to claim 3, the register unit including a data register, and
the operation unit performing command execution processing based on data which is written to the data register through the bus controller interface and the output of the command decoding unit.

14. An electronic apparatus comprising the integrated circuit device according to claim 10.

15. An electronic apparatus comprising the integrated circuit device according to claim 8.

16. An electronic apparatus comprising the integrated circuit device according to claim 9.

* * * * *